United States Patent

[11] 3,570,755

[72] Inventor Frederick W. Pfleger
1152 Barbara Drive, Cherry Hill, N.J. 08034

[21] Appl. No. 816,242
[22] Filed Apr. 15, 1969
[45] Patented Mar. 16, 1971

[54] PUNCHED-HOLE RESPONSIVE DEVICE
12 Claims, 6 Drawing Figs.

[52] U.S. Cl. .......... 234/86, 234/89
[51] Int. Cl. .......... G06k 1/14
[50] Field of Search .......... 234/84—86, 89

[56] References Cited
UNITED STATES PATENTS

| | | | |
|---|---|---|---|
| 1,195,477 | 8/1916 | Klugh .......... | 234/86X |
| 1,201,372 | 10/1916 | Smith .......... | 234/86 |
| 1,310,238 | 7/1919 | Fisher .......... | 234/85X |
| 2,367,568 | 1/1945 | Drown .......... | 234/85X |

*Primary Examiner*—William S. Lawson
*Attorney*—Robert K. Youtie

ABSTRACT: A punched-hole responsive device including a shift mechanism movable toward and away from a source document and carrying a feeler mechanism for sensing the presence or absence of a punched hole, which feeler mechanism in turn operates an output mechanism responsive to punched holes sensed.

INVENTOR.

BY Frederick W. Pfleger

Robert K. Yeutter
Attorney

INVENTOR.

BY Frederick W. Pfleger

Robert K. Youtie

Attorney

INVENTOR.

BY Frederick W. Pfleger

Robert K. Gautier
Attorney

PUNCHED-HOLE RESPONSIVE DEVICE

BACKGROUND OF THE INVENTION

This invention relates to information duplicating, and more specifically, the duplicating of one or more source documents containing punched hole information and combining this information from the one or more source documents into a resultant document which contains the combination of all the desired information in the source documents. In combination with providing this resultant document, this invention includes the capability of transferring the information to a computer or other auxiliary equipment in synchronism with the information as its being recorded on the resultant document.

Although equipment of this general type has been available in the field, this prior equipment has generally employed the combination of several individual equipments tied together by means of electronic, electric, or electromechanical combinations. These combinations of equipment utilize and/or include separate readers for reading each of the source documents, a programming device for establishing which of the source documents are to be read, a resultant punch mechanism and a control mechanism usually operated by electromechanical solenoids, responsive to the information read from the source documents by the readers. Obviously the use of these many readers and control elements can lead to potential errors in transferring the information from the source document to the resultant document and/or computer. Readers normally utilize in this type of equipment switch sensing, fingers sensing which operate switches, photoelectric sensing, or electrical conductive wire brush sensing. All of these types of sensing units have their own limitations and cost disadvantages. In many applications these readers read an entire document at one time, thus an auxiliary electromechanical or electronic sequencing system is required for transferring this information in serial form to the control mechanism for controlling the punches which will punch the resultant card.

SUMMARY OF THE INVENTION

The invention to be described in full detail and claimed by the attached claims is designed such that the source document reader and the punch control members are all associated mechanically in one mechanism. As a result, no electrical timing, programming or signal control is utilized. The invention also is designed such that the single mechanism is used to read all of the source documents thus eliminating the requirements for a multiple number of readers.

As a result of the above, it is an objective of this invention to provide a source document reader and a resultant document punch which can combine any information from source documents and duplicate this information into a resultant document.

It is another objective of this invention to provide a document duplicating machine in which only one document reader is needed regardless of the number of source documents.

It is another objective of this invention to provide a document duplicating machine in which no auxiliary equipment such as electrical contacts, solenoids, etc. are needed either in the programming or in the transferring of information from the source documents to the resultant document.

It is another objective of the invention to provide a document duplicating machine in which the relationship between the source document reader and the punching mechanism for punching the resultant document is a mechanical linkage.

It is another objective of this invention to provide a document duplicating machine in which the source documents of various thickness can be used.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
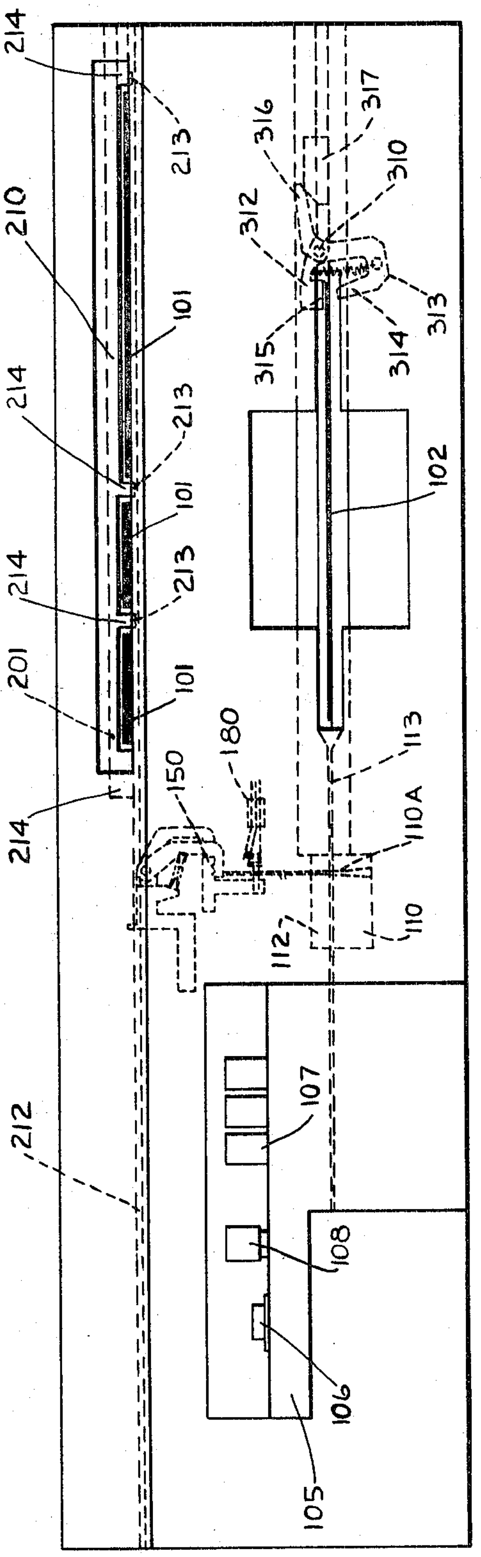
FIG. 1 represents a front view of a machine showing the source documents, the resultant documents and the relationship to the duplicating mechanism.

Referring to FIG. 1, source documents 101 are inserted into the machine in a movable carriage 201, many designs of which could be utilized. In all the designs, the carriage 201 must be capable of being moved across and in synchronism with the cycles of the card duplicating mechanism 150.

Figures 5, 6:
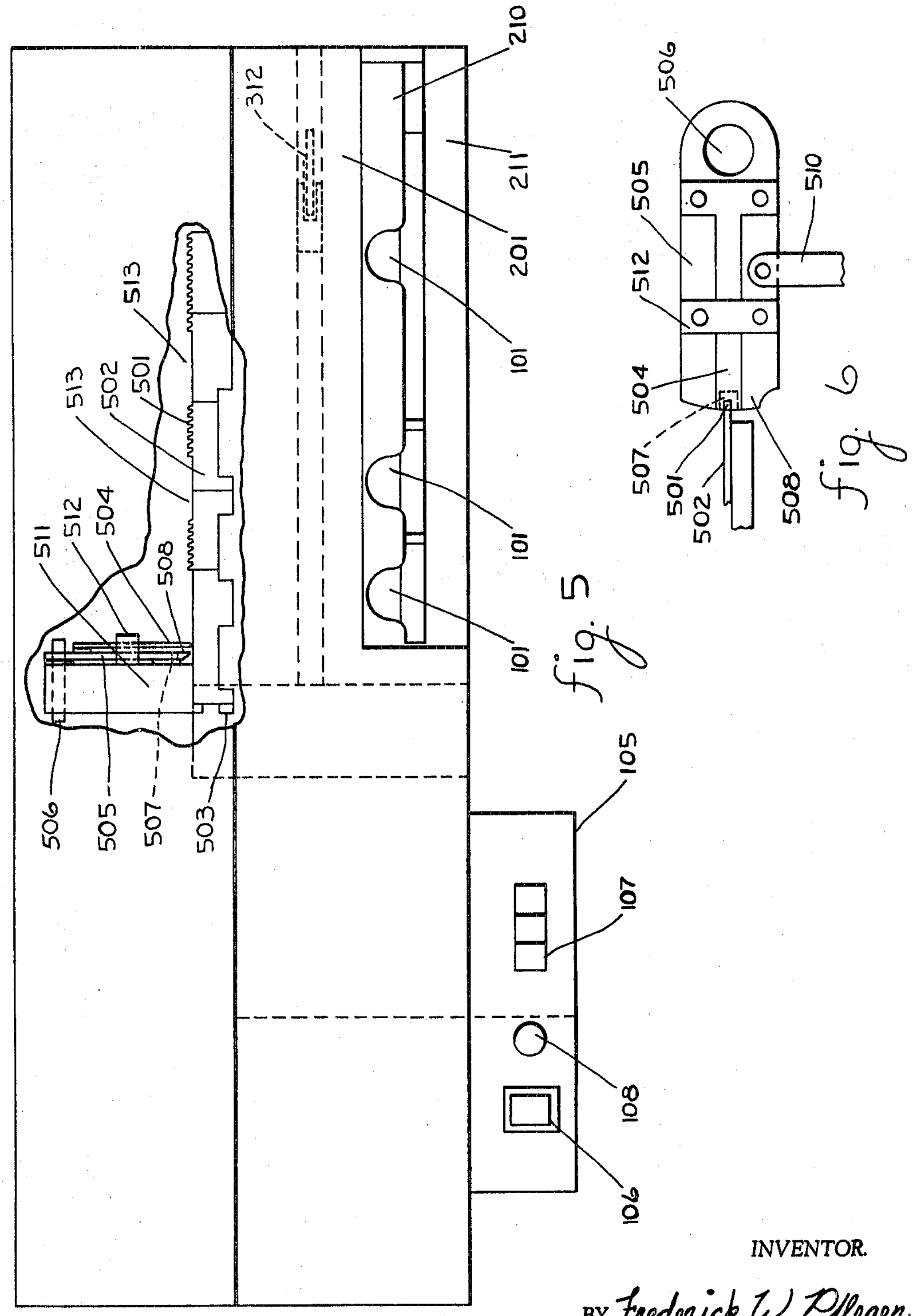
FIG. 5 is a plan view of the machine.
FIG. 6 is a partial front view of an oscillating member in the machine.

As shown in FIGS. 1 and 5, the carriage 201 consists of an overhanging plate 210 riding on a stationary bottom plate 211. The bottom plate 211 is provided with slots 212 which run the length of the plate 211. The overhanging plate 210 is provided with depending lugs 213 which fit into the slots and is also provided with pads 214 which ride on the bottom plate 211. The height of each pad 214 is a few thousandths of an inch higher than the thickness of a source document; as a result, different thickness source documents can be used provided the height of each pad 214 is made to match the thickness of the source document. The spacing of the pads 214 are such that they allow free insertion and removal of a source document. As a result of the size and depth of the pads, the carriage 201 combines with the common reference surface of the bottom plate 211, on which the carriage rides to form slots for the various source documents. The depending lugs 213, which ride in slots 212, are in line with each rearward pad 214 and act to prevent thin source documents from riding between the bottom of pads 214 and the top of the riding plate 211. The number of slots thus formed are therefore equal to the number of source documents to be read.

The resultant document 102 is shown inserted into a second carriage 301 which is parallel with and moves in timed relationship with the upper carriage 201 and the punch control assembly 150. Many types of document transporting carriages are available for transporting a document into a die for processing, each of which have their own advantage for their application. In this particular invention, a carriage which merely pushes the resultant documents through the die while holding the rear edge in gripping fingers, is a suitable type carriage.

As shown in FIGS. 1 and 5, the lower carriage 310 consists of a two-part gripper in which the upper arm 312 is secured to the escapement control bar to be described later and a lower arm 313 pivotally connected to the upper arm 312. A forward projecting portion 314 of arm 313 is held by a spring toward the holding surface 315, of the upper arm 312, when the carriage is in all positions except in the home position shown in FIG. 1. As shown in FIG. 1, a rearward projecting arm 316 of lower arm 313 is in engagement with a cam block 317 which cams the lower arm 313 in counterclockwise direction, thus providing the gap between the lower arm 313 and the lower holding block 315. With the arms thus in separated position, the resultant cards can be inserted into the machine for processing through the machine. As the carriage moves to the left, FIG. 1, the rearward arm 316 moves off the cam surface thus allowing the spring to rotate the lower arm 313 clockwise such that the forward projecting arm 314 clamps the resultant documents with the upper arm 312. As a result, the resultant documents are held in correct position with respect to the indexing mechanism while they are being indexed through the machine.

Figures 3, 4:
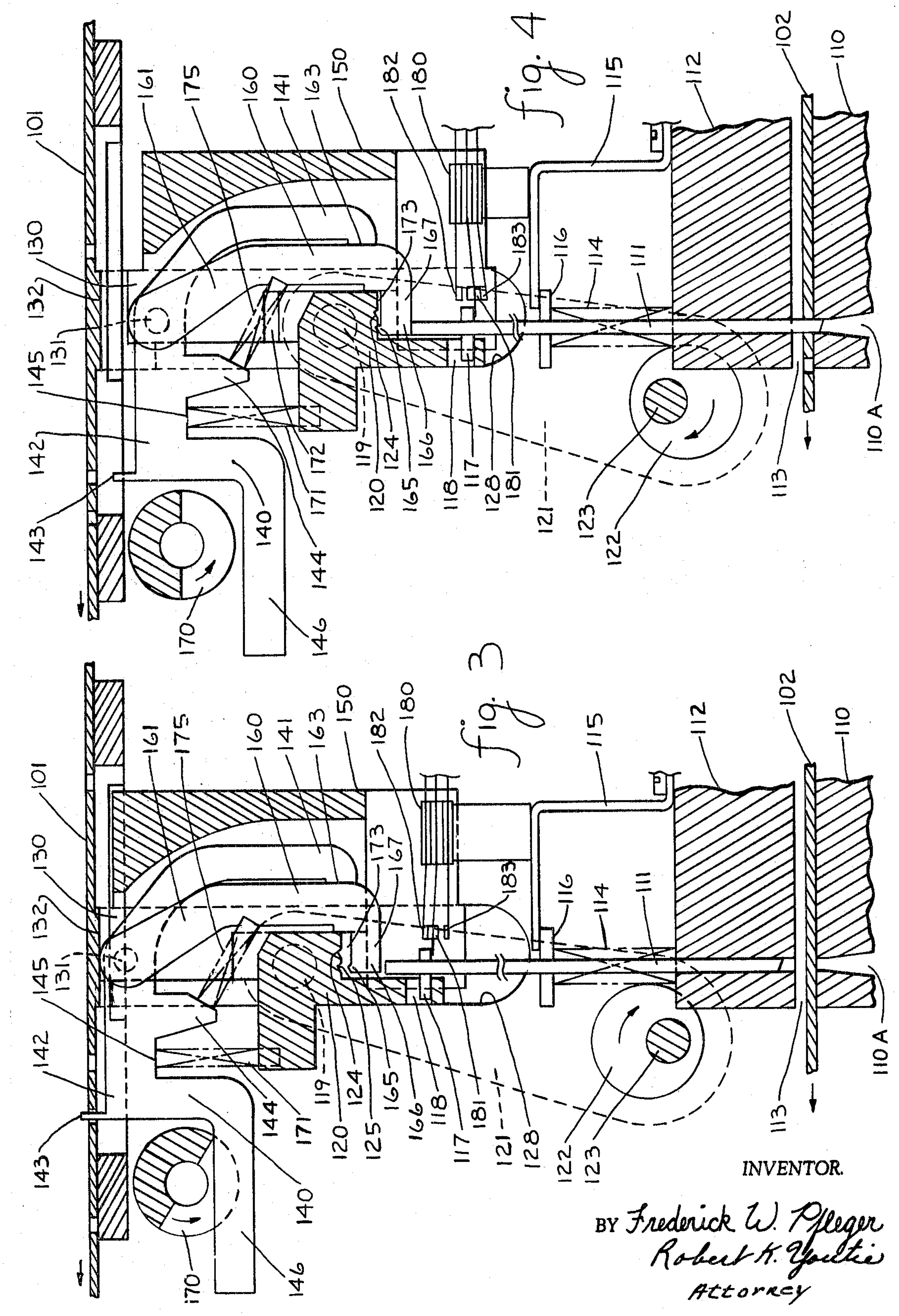
FIG. 3 is a cross section of the duplicating mechanism showing the read mechanism in read position with a source document.
FIG. 4 is a cross section of the duplicating mechanism showing the mechanism punching the resultant card after sensing information in a source card.

As shown in FIG. 5, the carriage escapement mechanism is essentially a series of sawteeth mounted to the movable carriage which pushes the cards through the machine. There are a series of these sawteeth associated with each of the source documents in the upper carriage and a series of sawteeth with each of the positions to be punched in the resultant document in the lower carriage. The sawteeth 501 are machined such that they are an integral part of upper mounting block 502 and are spaced one tooth with relationship to the next tooth a distance equivalent to the required spacing in the resultant document and equivalent to the prepunched holes in the source documents. After inserting the documents as previously described, and releasing the carriage from the home position stop 503, the upper and lower carriages are moved to their initial located position. That is the first tooth 501 of the first block 502 of the carriage is located against the flexible stop member 504, FIGS. 5 and 6, which is mounted to an oscillating escapement arm 505. This oscillating arm 505 is pivotally attached to the frame of the machine by means of a pin 506. The oscillating arm 505 has a slot 507 located at its forward end. In one position of oscillation, this slot is in alignment with the teeth 501 as shown in FIG. 6. The oscillating arm 505 is moved from the position shown in FIG. 6 upward a distance equivalent to the amount required to generate a gap between the lower surface of the spring 504 and the upper surface of the teeth 501. This oscillating motion is obtained by means of a connecting link 510 which ties upper and lower oscillating arms together so that they oscillate in timed relationship and follow a cam, not shown, which rotates in synchronism with the main shaft 123, FIG. 3. As a result, after the lower and upper carriages have been released from their home position where loading of documents take place, they move to the left, FIG. 5, until the teeth 501 contact the spring member 504. Since the upper and lower carriages are propelled to the left, FIG. 5, by means of a spring motor, not shown, interference engagement of the teeth 501 with the spring 504, causes the spring 504 to deflect to the left and bottom against the rightmost surface of oscillating arm 505 as shown in FIG. 5. This spring 504 is located in alignment with the slot 507 as shown in FIG. 6; as a result, the carriage is prevented from moving further to the left by spring 504. When the shaft 123 is rotated so that eccentric 122 is approaching top dead center, oscillating arm 505 is rotated clockwise, FIG. 6, about pivot 506 such that surface 508 of oscillating arm 505 is in alignment with the teeth 501 of block 502. Since oscillating arm 505 oscillates against a fixed block 511, close control of the dimensions between the carriage stop teeth 501 and the card sensing fingers 143 can be maintained. When the oscillating arm 505 moves to its upper position in which the teeth 501 came into engagement with the surface 508, the spring 504 is free to move back to its normal position as shown in FIG. 5. This normal position is controlled by a stop member 512. The amount of deflective movement allowed for spring 504 is sufficient to enable it to enter into the space between the tooth located against surface 508 and the next tooth on block 502. After the eccentric 122 passes top dead center and the source document sense fingers 143 move out of engagement with the source document as shown in FIG. 4, the oscillating arm 505 rotates counterclockwise, FIG. 6, into its lowered position as shown in FIG. 6. In this position, the tooth 501 that was resting against surface 508 enters into the slot 507 of oscillating arm 505 and the spring motor which propels the carriages to the left, moves the carriage so that the tooth 501 passes through this slot and moves the next tooth into engagement with the spring 504 again compressing it to the left into surface engagement with the oscillating arm 505. FIGS. 5 and 6 depict this operation with relationship to the upper carriage. Since this function is identical for the lower carriage, no further description is given for the lower carriage operation. If there are sections of the source documents for which the information contained in these sections is not desired in the resultant documents, it may be desirable to skip through this information. As a result, a certain sections of teeth 501 may be removed from the bar 502 thus producing the gaps 513 in the bars 502. When the oscillating arm 505 releases the tooth from the last position of any group of teeth, the carriages are free to move to the left, the distance equivalent to this gap. Since the escapement control for the upper and lower carriages is independent with respect to these teeth, it can be seen that the lower carriage would still only advance a single tooth even though the upper carriage may advance through a plurality of spaces. Conversely, if it is desired to provide spaces between information in the resultant document, not normally provided in the source documents, the teeth 501A of the lower bars can be removed from the bars 502A of the lower carriage resulting in spaces being inserted in the resultant documents not present in the source documents.

A keyboard control 105 is shown in FIGS. 1 and 5, which contains a power on/off switch 106 that controls power to the mechanism. It also contains switches 107 which start and control the movement of the carriages in timed relationship with the motion of the document sensing and punching mechanism 150. An emergency switch 108 is provided to return the card carriages to home position in cases of malfunctions of the transporting mechanisms.

As shown in FIGS. 3 and 4, the document reproducing or output mechanism 150 comprised a resultant document punching die 110 and punches 111 which act with the die 110. A punch guide block 112 is mounted in a fixed relationship with the die 110 such that it provides a channel 113 through which the resultant documents 102 move. The guide 112 also aligns the punches 111 in a nonpunching position such that the punches 111, not being used for a particular cycle, do not extend into the card channel 113. A retainer plate 115 is mounted to the punch guide block 112 in such a manner that it limits the upper retracted position of the punches 111. A pin 116 is used to retain the spring 114 and also acts as the stop member against the punch retainer plate 115. At the upper end of punch 111 is a pin 117 securely mounted in each punch 111 and extending into an elongated slot 118 of punching bar 120. Punching bar 120 is connected by a pin 119 to a bellcrank 121, shown dotted, since it normally is located outside of the machine frame for ease in servicing and construction. The other end of bellcrank 121 is connected to an eccentric 122 on shaft 123 such that rotation of shaft 123 one revolution moves the bell crank 121 in a cycle of vertical reciprocating motion. As a result, when bellcrank 121 is oscillated through a single cycle of motion, the punch block 120 is also moved through a single cycle of motion.

In order to insure that the upper end of the bellcrank 121 and the punch block 120 oscillate in a truly vertical motion, the ends of the punch block 120 are designed to cooperate with the ends of the punch control block 130 to fit into a vertical slot 128 in the side frame of the machine. In order not to confuse the drawings, the side frame itself has been removed, although the vertical slot 128 is depicted. Punch control block 130 is mounted adjacent to the punch block 120 in vertical sliding relationship therewith. The outer ends of punch block 120 and punch control block 130 may be considered as slide elements forming a slide or shift mechanism which works in the vertical guide slot 128. The punch control block 130 is used to mount source document sensing arm or feeler mechanism 140 and the punch control or interposer arm 160. For each of the series of holes to be sensed, in any one serial location on the source document, there is one source document feeler or sensing arm 140 and a punch control or interposer arm 160. These arms, the source document sensing arm 140 and the punch control arm 160, are pivotally connected to the punch control block or slide element 130 by a pin 131.

The punch control or interposer arm 160 consists of an upper portion 161 mounted on pin 131 and a lower portion 162 comprising a surface 163 which acts with a surface on the source document sensing arm 140. A punch interposer portion 164 of the arm 160 has on its upper surface a latching tooth member 165. The latching tooth member 165 is positionable so that it functions with one of two notches 124 and 125 of the punch control block 120. The action of this latch control will be more fully described later. The source document sensing arm 140 comprises a lower extension or operator arm 141 which cooperate with the surface 163 of the punch control arm 160 and an upper arm portion 142 which is mounted on pivot pin 131. The upper arm portion 142 comprises sensing fingers 143, spring control depending arm 144, spring holding surface 145 and a cam actuated control arm 146. These various portions of the upper arm 142 and their functions will be described later.

One depression of the operate key 107, after turning on power with the power control button 106, the source documents 101 and the resultant document 102 are transported by the carriages moving these documents as previously described into their first positions for sensing and punching as shown in FIG. 3. After both carriages are advanced to the number one position of their document, a clutch, not shown, is turned on and provides for a single revolution of the shaft 123 and eccentric 122. This clutch actuation is repeated for each sensing position associated with the source documents. The home position of the eccentric 122, when the clutch is in its disengaged condition, is approximately 60° before top dead center when the eccentric 122 is oscillated clockwise, as shown in FIG. 3. As a result, in this home or nonoperate mode of the machine, the eccentric arm 121, the punch block 120, the control block 130 and the document sense arms 140 together with their card sensing fingers 143, are held below their uppermost position in a distance to permit the source document 101 to pass the sensing fingers 143 without interference. In order to assure that the sensing fingers 143 are not in the card sensing position before top dead center, an auxiliary cam 170 is mounted to control card sensing arms 140. In other words, even though the eccentric, the punch control block and the sensing control block may be advanced in the cycle, the sensing control fingers are prevented from moving into card sensing position by the interference between arm 146 and the cam 170. As shown in FIG. 3, the cam 170 has just released the arms 146 so that the card sense fingers and the card sense arms 140 can rotate in clockwise direction about pivot pin 131. The force necessary to rotate the source document sense arm 140 in clockwise direction is provided by a spring 171 mounted between the punch control block 120 and the card sensing arm 145. When the source document read arm 140 is permitted to rotate into a document hole, as shown in FIG. 3, the punch control arm 160 is rotated clockwise by means of the depending arm 141, pushing against the surface 163. As the eccentric 122 continues to rotate in a clockwise direction, the punch control block 120 is pulled in a downward direction. During the downward motion, the inner latch control slot 125 engages the latch tooth 165 of the punch control arm 160 and latches the punch control arm 160 in its clockwise position. When the punch control arm 160 is latched in this clockwise position, a lower pad surface 166 of control arm 160 is held in such a position that it's in interference relationship with the upper end of the punch 111. Further rotation of the eccentric 122 moves the link 121, the punch control block 122, the punch control arms 160 and the punches 111 into a lowermost position as shown in FIG. 4. As a result, the resultant document 102 previously having being located in punching position in card channel 113, FIGS. 1 and 3 will be punched by the punches 111 going through the resultant document 102 into the die 110, as shown in FIG. 4. As the eccentric 122 continues in its clockwise rotation, it moves the connecting link 121, the punch control block 120, the card sensing block 130, the sense control arm 140, and the punch control arm 160 in an upward direction. As previously described, the upper end of punches 11 have a pin 117 which engages a slot 118 of punch control block 120. As a result, when the punch control block 120 moves in the upward direction, the punches 111 are withdrawn from the die 110, the document 102 and into the punch guide 112 as shown in FIG. 3. At the conclusion of the cycle of operation, the documents 101 and 102 are advanced to the next sensing and punching position as previously described. If a hole is again located in the sensed document at this position, the cycle previously described will be repeated.

Figure 2:
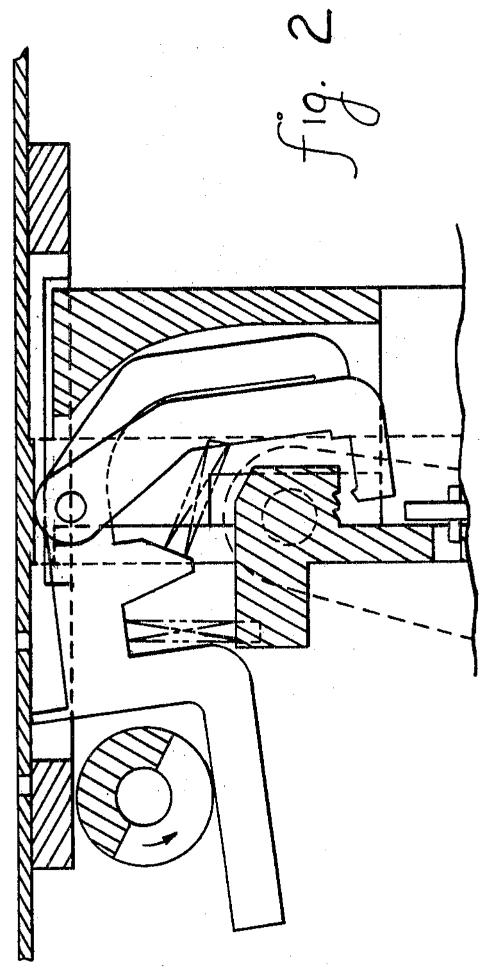
FIG. 2 is a cross section of the machine taken through and showing the source document reading and punching mechanism in a nonread mode.

Before the eccentric 122 reaches its normal position, previously described, the cam sensing arm 146 of document sense arm 140 will come in engagement with the cam 170. As a result, the sense arm 140 will rotate counterclockwise during the upward movement of the punch control block 120, the sense control block 130 and the pin 131. Since the punch control block 120 through its interlatching surface 125, retains the punch control arm 160 in latched position, only the sense arm 140 rotates counterclockwise. As shown in FIGS. 3 and 4, the punch control block 120 and the card sense block 130 are constructed such that a gap 172 or 173 exists between these two blocks. The gap 172 is maintained by the accumulated force of the springs 171 mounted between the punch control block 120 and the document sensing arm 140. Since the document sensing arm 140 is prevented from rotating and since the spring 171 is located relatively close to the pin 131, the vertical force of the springs 171 keep the punch control arms 140, the pivot pin 131 and the punch sense block 130 in such a position that the gap 172 is maintained. When the eccentric 122 approaches top dead center, the document sensing block 130 comes into interference engagement with a fixed surface 132 on the machine. As a result, further upward motion of punch control block 120 from the normal home position to top dead center position transfers the gap 172 as shown on FIG. 4 to the gap 173 as shown in FIG. 3, and in doing so, further compresses springs 171. If desired, secondary springs could be incorporated in the structure to aid the springs 171 in this control function. As previously described, when the eccentric 122 is in its home position, the source document sensing arm 140 is rotated in counterclockwise direction. As the gap 172, as shown in FIG. 4, transfers to the gap 173, as shown in FIG. 3, latching surface 165 of the punch control arm 140 disengages from the inner latch control groove 125. During the clockwise rotation of the document sensing arm 140, a spring 175 mounted between source document sensing arm 140, a spring 175 mounted between source document sense arm 140 and the punch control arm 160 compresses. As a result, when the gap 173 is generated, as shown in FIG. 3, the punch control arm 160 is free to rotate due to the force in spring 175 into counterclockwise position as shown in FIG. 2. The clockwise rotation of both the document sense arm 140 is generated, as shown in FIG. 3, the punch control arm 160 is free to rotate due to the force in spring 175 into counterclockwise position as shown in FIG. 2. The clockwise rotation of both the document sense arm 140 and the punch control arm 160 is under control of the cam 170. In other words, as the source document sense arm 140 is moving in the upward direction, its arm 146 contacts the cam 170 thus preventing the arm 146 from further upward movement. As the pivot pin 131 continues in its upward movement until the sense control block 130 reaches surface 132, the source document sensing arm 140 and the punch control arm 160 are rotated counterclockwise as previously described. If on the following cycle no hole exists in the sense position, the source document sensing arm 140 and the punch control arm 160 are held in the clockwise position as shown in FIG. 2. The counterclockwise rotation of these two arms, as previously described, places the punch control arm latching surface 165 in alignment with the outer groove 124 of the punch control block 120. Downward movement of the punch control block 120 engages and latches the punch control arms 160 in their counterclockwise position. In this counterclockwise position, the punch control arm is free to pass along side the upper end of the punches 111; as a result, if the source document sensing arms 140 sense a "No hole condition" the punch control arm 160 is positioned in such a position that the punches 111 will not be moved in that cycle. As previously described, the punch block 120 is provided with a slot 118 which cooperates with pins 117 of punches 111 to retract the punch from the die. In the non-punch mode of operation just described, the slot 118 allows the punch block 120 to move downward without causing movement of the punches 111. The punches are retained in their uppermost position as shown in FIG. 3 by means of the compression spring 114 holding a pin 116 against the bracket 115 as previously described.

The above cycles are automatically repeated for each set of source documents, sensing each column successively of the source documents in the upper carriage 111 and punching the resultant document as required in the lower carriage 112.

While the interposer arm 160 has been shown and described herein as separate from and pivotally connected to the feeler mechanism or lever 140, it is understood that the interposer arm and feeler mechanism may be rigidly united or integral, if desired. Further, an interposer member corresponding to the lower interposer portion 162 may be carried directly by the feeler mechanism arm 141, if desired.

As previously mentioned, it may be desirable to simultaneously record the information that is being punched into the resultant documents in other media or other systems, such as a computer system. In order to accomplish this, switches 180 as shown in FIGS. 3 and 4, are associated with the punch pin 117 of punches or output mechanism 111. When the punches 111 are in their nonoperated position, FIG. 3, the common center contact 181 is in normally closed contact with upper switch contact 182, leaving the normally open circuit between contacts 181 and 183. When a punch is depressed, FIG. 4, pin 117 moves the center contact downward to close the contacts 181 and 183, and open contracts 181 and 182. As a result, switch closures or openings can be obtained by the common contact 181 of the switch 180 following the movement of punch 111. Of course, it is appreciated that switch means may be otherwise connected for actuation responsive to sensing the presence or absence of a hole in a source document, say being operated by the sensing mechanism 141 or interposer 160.

From the above description as read in light of the drawings, it can be seen that a simplified punched document duplicating mechanism has been accomplished in which the objects desired are achieved.

Although the present invention has been described in some detail by way of illustration and example for purposes of clarity of understanding, it is understood that certain changes and modifications may be made within the spirit of the invention.

I claim:

1. A punched-hole responsive device comprising a carrier for moving a punched-hole source document along a path into and out of a sensing position, a shift mechanism mounted adjacent to said sensing position for movement transversely of a source document in said sensing position, a feeler mechanism carried by said shift mechanism for movement therewith and movement relative to the shift mechanism and a source document in said sensing position, said feeler mechanism being movable relative to said shift mechanism for sensing the presence and absence of a hole in the source document, an output mechanism and operatively connected to said shift mechanism for actuation thereby upon feeler mechanism movement on sensing the presence of a source document hole, and a control member movable located along the path of movement of said feeler mechanism for movement into and out of limiting engagement with the latter to prevent feeler mechanism movement toward a source document in sensing position, said control member being movable in timed relation with said shift mechanism to release said feeler mechanism for its movement toward a source document.

2. A punched-hole responsive device according to claim 1, in combination with resilient means urging said feeler mechanism to its positions of movement toward a source document and yieldably resisting feeler mechanism movement away from a source document.

3. A punch-hole responsive device comprising a carrier for moving a punched-hole source document along a path into and out of a sensing position, a shift mechanism mounted adjacent to said sensing position for movement transversely of a source document in said sensing position, a feeler mechanism carried by said shift mechanism for movement therewith and movement relative to the shift mechanism and a source document in said sensing position, said feeler mechanism being movable relative to said shift mechanism for sensing the presence and absence of a hole in the source document, an output mechanism movably mounted adjacent to and spaced from said shift mechanism, an interposer movable into and out of an interposed position between said shift and output mechanisms responsive to operation of the feeler mechanism for selectively effecting operation of the output mechanism upon movement of the shift mechanism when in position therebetween responsive to sensing the presence and absence of a punched hole at a sensing position, and a control member movably located along the path of movement of said feeler mechanism for movement into and out of limiting engagement with the latter to prevent feeler mechanism movement toward a source document in sensing position, said control member being movable in timed relation with said shift mechanism to release said feeler mechanism for its movement toward a source document.

4. A punched-hole responsive device comprising a carrier for moving a punched-hole source document along a path into and out of a sensing position, a shift mechanism mounted adjacent to said sensing position for movement transversely of a source document in said sensing position, a feeler mechanism carried by said shift mechanism for movement therewith and movement relative to the shift mechanism and a source document in said sensing position, said feeler mechanism being movable relative to said shift mechanism for sensing the presence and absence of a hole in the source document, an output mechanism movable mounted adjacent to and spaced from said shift mechanism, an interposer movable into and out of an interposed position between said shift and output mechanisms responsive to operation of the feeler mechanism for selectively effecting operation of the output mechanism upon movement of the shift mechanism when in position therebetween responsive to sensing the presence and absence of a punched hole at a sensing position, said shift mechanism comprising a pair of slide elements movable transversely of a source document in said sensing position together in abutting unison and relative to each other, and resilient means urging said slide elements apart and yieldably resisting movement of said slide elements together on movement toward said source document, said interposer being movable into and out of its interposed position when said slide elements are together.

5. A punched-hole responsive device according to claim 1, in combination with an additional carrier for moving a resultant document relative to said output mechanism and in timed relation with said source document, said output mechanism comprising punch means for punching said resultant document responsive to punched holes sensed in said source document.

6. A punched-hole responsive device comprising a carrier for moving a punched-hole source document along a path into and out of a sensing position, a shift mechanism mounted adjacent to said sensing position for movement transversely of a source document in said sensing position, a feeler mechanism carried by said shift mechanism for movement therewith and movement relative to the shift mechanism and a source document in said sensing position, said feeler mechanism carried by said shift mechanism for movement therewith and movement relative to the shift mechanism and a source document in said sensing position, said feeler mechanism being movable relative to said shift mechanism for sensing the presence and absence of a hole in the source document, an output mechanism movably mounted adjacent to and spaced from said shift mechanism, an interposer movable into and out of an interposed position between said shift and output mechanisms responsive to operation of the feeler mechanism for selectively effecting operation of the output mechanism upon movement of the shift mechanism when in position therebetween responsive to sensing the presence and absence of a punched hole at a sensing position, said carrier being provided with a plurality of source document receivers for carrying a plurality of source documents.

7. A punched-hole responsive device according to claim 1, in combination with electrical switch means connected for operation responsive to sensing the presence and absence of a hole in a source document.

8. A punched-hole responsive device according to claim 3, said shift mechanism comprising slide means reciprocable toward and away from a source document and said sensing position, said feeler mechanism comprising a lever pivoted to said slide means and having a finger engageable through a punched hole in the source document at said sensing position, and operating means comprising an extension on said lever and engageable with said interposer upon lever movement to hole sensing position.

9. A punched-hole responsive device comprising a carrier for moving a punched-hole source document along a path into and out of a sensing position, a feeler mechanism carried by said shift mechanism for movement therewith and movement relative to the shift mechanism and a source document in said sensing position, said feeler mechanism being movably relative to said shift mechanism for sensing the presence and absence of a hole in the source document, an output mechanism movable mounted adjacent to and spaced from said shift mechanism, an interposer movable into and out of an interposed position between said shift and output mechanisms responsive to operation of the feeler mechanism for selectively effecting operation of the output mechanism upon movement of the shift mechanism when in position therebetween responsive to sensing the presence and absence of a punched hole at a sensing position, said shift mechanism comprising slide means reciprocable toward and away from a source document at said sensing position, said feeler mechanism comprising a lever pivoted to said slide means and having a finger engageable through a punched hole in the source document at said sensing position, and operating means comprising an extension on said lever and engageable with said interposer upon lever movement to hole sensing position, said interposer comprising an arm pivoted to said slide means for movement therewith and swinging movement into and out of its interposed position.

10. A punched-hole responsive device according to claim 9, said slide means comprising a pair of slide elements movable transversely of a source document in said sensing position together in abutting unison and relative to each other, and resilient means urging said slide elements apart and yieldably resisting movement of said slide elements together on movement toward said source document, said feeler lever and interposer arm being pivoted to one of said slide elements, and said interposed position being between the other of said slide elements and said output mechanism.

11. A punched-hole responsive device according to claim 3, said control member comprising a cam.

12. A punched-hole responsive device according to claim 1, said carrier being provided with a plurality of source document receivers for carrying a plurality of source documents.